United States Patent Office 3,337,015
Patented Aug. 22, 1967

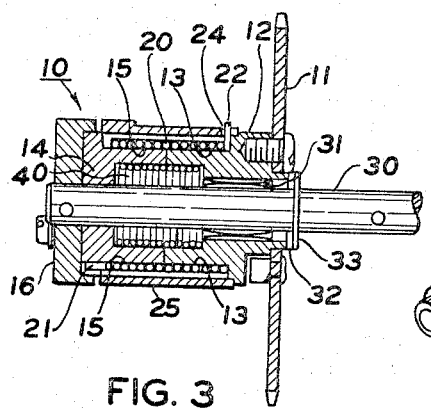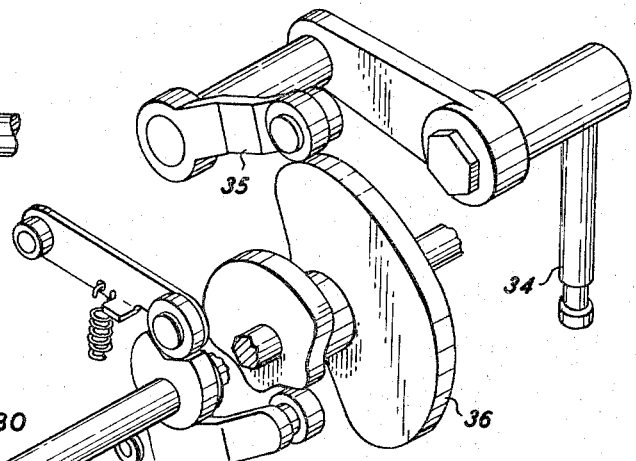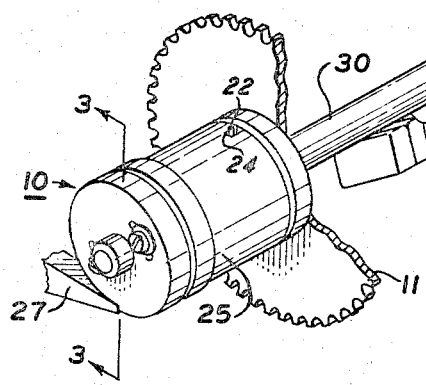

3,337,015
LATCH OPERATED AND ONE WAY COIL CLUTCHES
John W. Wagner, Penfield, N.Y., assignor to Xerox Corporation, Rochester, N.Y., a corporation of New York
Filed July 1, 1965, Ser. No. 468,868
4 Claims. (Cl. 192—48)

ABSTRACT OF THE DISCLOSURE

A spring clutch having a drive spring pre-loaded against hollow clutching members to form a drive coupling on the external portion of the clutch members, and an internal spring axially pre-loaded against the inner portions of the clutching members to control the relative movement of the two members in accordance with a sequentially engageable release and stop member.

---

This invention relatest to clutches and in particular to spring clutches.

More specifically, this invention relates to a one-way, one-revolution spring clutch for converting continual rotary movement of a drive member to intermittent unidirectional rotary movement of a driven member.

It is now well understood in the art that a conventional spring clutch may include driving and driven members having axially aligned, cylindrical driving and driven surfaces. A helical spring surrounds the cylindrical surfaces and is so wound that it engages the surfaces with an interference fit. If unobstructed, the spring being tightly wound on the clutching surfaces, defines a driving connection between the driving and driven members and rotates therewith. One end of the spring is bent away from the helix for forming a tang which rotates with the spring. By stopping rotation of the tang, further rotation of the clutch driving surface unwinds the spring, increasing its helix diameter and disengaging the spring from the clutch driving surface. When the tang is released, the spring helix winds, again gripping the cylindrical driving surface and transmitting motion thereof to the driven member.

In prior clutch mechanisms, when the spring tang is engaged to prevent its rotation with the clutching surfaces and the driven member disengaged from the spring coupling, the angular momentum of the driven member causes this member to continue rotation for a finite period of time. It has also been found that when clutches of this type, having a helical spring in interference relationship with the clutching surfaces, have a force applied through the driven member in the normal direction of rotation, the driven member will overrun the drive member in the direction of its normal rotation.

The new clutch mechanism of this invention provides a one-revolution clutch adapted to release the driven member, stop its rotation at an exact predetermined point, and prevent overrunning movement of the driven member due to inertia of the mechanical linkage connected thereto.

It is, therefore, an object of this invention to improve one-revolution clutch mechanisms in a manner to permit the disengagement of the driven member and to stop the clutch rotation at an exact predetermined point.

A further object of this invention is to improve one-revolution clutch mechanisms in a manner to prevent the driven member from overrunning the drive member.

Another object of this invention is to improve one-revolution clutch mechanisms to prevent overrunning of the driven member before and after disengagement from the driving member.

For a better understanding of the invention, as well as further objects and features thereof, reference is had to the following detailed description of the invention to be read in connection with the accompanying drawings, wherein:

FIG. 1 illustrates an embodiment of the subject invention in a suitable environment;

FIG. 2 is an end view of the subject invention with parts broken away to better illustrate the construction thereof;

FIG. 3 is a cross-section view taken along section 3—3 of FIG. 1.

Referring now to the drawings, there is shown in FIG. 1 an embodiment of the subject invention in a suitable environment such as a sheet feeding mechanism of the type disclosed in copending application Ser. No. 400,465 filed Sept. 30, 1964, in the name of John W. Wagner, although it should be noted that the invention is not to be limited to this type of environment.

The clutch mechanism 10 is used to control the movement of a plurality of hollow vacuum feet, one of which is shown at 34, used for seriatim feeding of sheet material into a xerographic processor. In the sheet feeding cycle, the vacuum feet contact a sheet of material and hold the material thereto by a pressure differential. The vacuum feet are then lifted vertically and moved horizontally to feed the sheet material onto a conveyor. This programmed movement of the vacuum feet is effected by the rotation of a cam 36 secured to shaft 30 and controlled by the clutch mechanism 10.

As the vacuum feet are moved for the feeding of sheet material, a follower arm 35, spring loaded against the cam 36 to assure precise control of the vacuum feet movement, attempts to accelerate the shaft 30 as the arm passes from the rise portion to the fall portion of the cam. To prevent the driven element from overrunning the drive element due to the force of the follower arm on the fall portion of the cam 36, a clutch spring is provided within the hollow portions of these elements, as seen in FIG. 3. This clutch spring 40 is concentrically mounted inside the hollow portion of the drive and driven members 12 and 14, respectively, and preloaded against the inner portions of these members to prevent the shaft 30 from overrunning in the same direction to that in which the shaft is driven by expanding the coils of the spring against the hollow portions of these members and preventing the driven element from rotating at a greater speed than that of the drive element.

Referring now to FIG. 3, the clutch mechanism 10 is driven by means of a link driven sprocket 11 suitably fixed to a drive clutch member 12 mounted for rotation about a shaft 30 on bearings 31 and held in axial alignment on its inboard side through a spacer 32 abutting a retaining ring 33 secured in a slot provided in shaft 30. A driven clutch member 14 is secured by suitable means to the shaft 30 coaxially and adjacent to drive member 12 and operatively connected thereto by helical drive spring 20 elastically preloaded against the clutching surfaces 13 and 15 of the drive and driven members, respectively. The drive spring 20 has a driven end portion 21 secured in a suitable recess of the driven member 14 and a drive end portion 22 extending outwardly from the clutching surface of the drive member 12 and engaged in a suitable spring recess 24 of a clutch sleeve 25 supported on the drive and driven members 12 and 14, respectively, in a manner to allow these elements to be rotated when the clutch sleeve 25 is stopped, thereby uncoiling the drive spring 20 and releasing the drive member 12 from engagement with the driven member 14. Stoppage of the clutch sleeve 25 is effected by engagement of a pawl 27 into a recess 26 in the sleeve preventing the sleeve from rotating with the clutch mechanism.

When the pawl 27 engages the recess 26 of the clutch sleeve 25, the clutch mechanism continues to rotate, unwinding the drive spring 20 and releasing the coupling to the driven member 14. In order that the driven member be stopped at a precise predetermined point and to prevent additional movement due to the momentum of the mechanism, a clutch cap 16 having a recess 17 is adjustably secured to the driven member 14 by suitable means, for example as shown in FIGS. 1, 2 and 3 a pair of cap screws passing through annular slots in the clutch cap and engaging the driven member, to be engaged by the pawl 27 after the drive spring 20 has been uncoupled from the drive member through operation of the pawl 27 engaging recess 26 of the clutch sleeve 25 thereby stopping the driven member 14 and shaft 30 at a fixed predetermined point. A clutch spring 40 is concentrically mounted inside the hollow portion of the drive and driven members 12 and 14, respectively, and preloaded against the inner portions of these members to prevent the shaft 30 from overrunning in the same direction to that in which the shaft is driven due to the inertia of the mechanical linkage connected thereto.

While the invention has been described with reference to the structure disclosed herein, it is not limited to the details set forth since it is apparent that various modifications can be made to the clutch mechanism. This application is, therefore, intended to cover such modifications or changes as may come within the objectives of this invention or the scope of the following claims.

What is claimed is:

1. A clutch mechanism including
a support shaft,
a hollow stepped cylindrical drive member having an enlarged support portion and reduced clutching surface portion journaled for rotation on said shaft,
a hollow stepped cylindrical driven member having an enlarged support portion and a reduced clutching surface portion secured to said shaft for rotation therewith,
said drive and driven members having said cylindrical clutching surfaces positioned adjacent each other,
a helical drive spring encompassing said clutch surfaces and having an interference fit therewith,
said drive spring having a driven end portion engaged in said driven element and a drive end portion extending outwardly from said clutching surfaces,
a clutch sleeve member circumferentially supported for movement about said drive spring on said support portions of said drive and driven members adapted to engage said drive end portion of said drive spring,
said sleeve member having a stop portion adapted to be engaged to prevent the rotation of said sleeve with said drive and driven members,
a clutch cap adjustably secured to said driven member and having a stop portion adapted to be engaged to prevent rotation of said driven member,
a full-floating helical clutch spring concentrically encircling said support shaft and having coils elastically preloaded radially against said inner portions of said drive and driven members and adapted to prevent rotation of said members in a direction counter to the windings of said clutch spring,
stopping means to sequentially engage said sleeve and cap stop portions to prevent rotation thereof, and
control means for actuating said stopping means at a predetermined time in relation to the occurrence of events.

2. A clutch mechanism including
a hollow stepped cylindrical drive member having an enlarged support portion and reduced clutching surface portion,
a hollow stepped cylindrical driven member having an enlarged support portion and a reduced clutching surface portion,
said drive and driven members having said cylindrical clutching surfaces positioned adjacent and coaxial,
a helical drive spring encompassing said clutch surfaces and having an interference fit therewith,
said drive spring having a driven end portion engaged in said driven element and a drive end portion extending outwardly from said clutching surfaces,
a clutch sleeve member circumferentially supported for movement about said drive spring on said support portions of said drive and driven members adapted to engage said drive end portion of said drive spring,
said sleeve member having a stop portion adapted to be engaged to prevent the rotation of said sleeve with said drive and driven members,
a clutch cap adjustably secured to said driven member and having a stop portion adapted to be engaged to prevent rotation of said driven member,
a full-floating helical clutch spring having coils elastically preloaded radially against said inner portions of said drive and driven members and adapted to prevent rotation of said members in a direction counter to the windings of said clutch spring,
stopping means to sequentially engage said sleeve and cap stop portions to prevent rotation thereof, and
control means for actuating said stopping means at a predetermined time in relation to the occurrence of events.

3. A clutch mechanism including
a support shaft,
a hollow drive member rotatably mounted thereon,
a hollow driven member secured for rotation with said shaft,
a helical drive spring encircling at least a portion of said drive and driven members and having an interference fit therewith,
said drive spring having a tang portion extending outwardly from its coiled portion,
release means adapted to engage said tang to uncoil said drive spring,
adjustable stop means secured to said driven member adapted to prevent rotation thereof,
a helical clutch spring preloaded against the hollow portions of said drive and driven members and adapted to prevent said members from rotating in a direction counter to the winding of said clutch spring, and
means actuable at a predetermined time in relation to the occurrence of events to sequentially engage said release means and said stop means to uncoil said drive spring and to prevent the rotation of said driven member respectively.

4. A clutch mechanism including
a hollow stepped cylindrical drive member having an enlarged support portion and reduced clutching surface portion,
a hollow stepped cylindrical driven member having an enlarged support portion and a reduced clutching surface portion,
said drive and driven members having said cylindrical clutching surfaces positioned adjacent and coaxial,
a helical drive spring encompassing said clutch surfaces and having an interference fit therewith,
said drive spring having a drive end portion extending outwardly from said clutching surfaces,
a clutch sleeve member circumferentially supported for movement about said drive spring on said support portions of said drive and driven members adapted to engage said drive end portion of said drive spring,
said sleeve member having a stop portion adapted to be engaged to prevent the rotation of said sleeve with said drive and driven members, a clutch cap adjustably secured to said driven member and having a stop portion adapted to be engaged to prevent rotation of said driven member, a full-floating helical clutch spring having coils elastically preloaded radially against said inner portions of said drive and driven members and adapted to prevent rotation of said members in a direction counter to the windings of said clutch spring, stopping means to sequentially engage said sleeve and cap stop portions to prevent rotation thereof, and control means for actuating said stopping means at a predetermined time in relation to the occurrence of events.

References Cited

UNITED STATES PATENTS

| | | | |
|---|---|---|---|
| 2,475,432 | 7/1949 | Marihart | 192—33 |
| 2,669,331 | 2/1954 | Dudis et al. | 192—33 X |
| 2,885,042 | 5/1959 | Freelette | 192—12 |
| 3,021,512 | 2/1962 | Welsh et al. | 192—12 X |
| 3,026,739 | 3/1962 | Hungerford et al. | |

OTHER REFERENCES

Rex: IBM Technical Disclosure Bulletin, July 1961, page 6, volume 4, No. 2.

BENJAMIN W. WYCHE III, *Primary Examiner.*